United States Patent
Li et al.

(10) Patent No.: US 6,802,536 B2
(45) Date of Patent: Oct. 12, 2004

(54) ADAPTIVE ENERGY ABSORBING DEVICE FOR A STEERING COLUMN

(75) Inventors: Xiaoyu Li, Saginaw, MI (US); Marvin V. Manwaring, Clio, MI (US); Melvin Lee Tinnin, Clio, MI (US); Ravindra Jwalapathy, Saginaw, MI (US); Ray G. Armstrong, Bay City, MI (US)

(73) Assignee: Delphi Technologies, Inc., Troy, MI (US)

(*) Notice: Subject to any disclaimer, the term of this patent is extended or adjusted under 35 U.S.C. 154(b) by 96 days.

(21) Appl. No.: 10/373,402

(22) Filed: Feb. 24, 2003

(65) Prior Publication Data
US 2004/0164538 A1 Aug. 26, 2004

(51) Int. Cl.[7] .............................................. B62D 1/19
(52) U.S. Cl. ....................... 280/777; 74/492; 188/374
(58) Field of Search ......................... 280/777; 74/492, 74/493; 188/371, 374

(56) References Cited

U.S. PATENT DOCUMENTS

| | | | |
|---|---|---|---|
| 6,176,151 B1 | 1/2001 | Cymbal | |
| 6,322,103 B1 | 11/2001 | Li et al. | |
| 6,450,532 B1 | 9/2002 | Ryne et al. | |
| 6,454,302 B1 | 9/2002 | Li et al. | |
| 6,575,497 B1 | 6/2003 | McCarthy et al. | |
| 6,652,002 B2 * | 11/2003 | Li et al. | 280/777 |
| 6,749,221 B2 * | 6/2004 | Li | 280/777 |
| 2003/0226417 A1 * | 12/2003 | Manwaring et al. | 280/777 |

* cited by examiner

Primary Examiner—Peter C. English
(74) Attorney, Agent, or Firm—Michael D. Smith

(57) ABSTRACT

An energy absorbing device for a collapsible steering column of a vehicle is able to compensate for the severity of a crash and the weight of the driver to better manage the absorption of energy in a crash event. A housing has at least one fixed abutment surface, and at least one adjuster disposed in the housing for selective lateral slidable movement. At least one anvil is disposed adjacent an initial abutment surface of the adjuster in spaced relation to the fixed abutment surface of the housing in a first position of the anvil associated with high energy absorption. A plastically deformable strap is supported between the anvil and the housing. The adjuster slides out of the path of the anvil in a crash event in response to input of a control signal allowing the anvil to slide into contact with the fixed abutment surface of the housing to define a second position of the anvil associated with lower energy absorption.

10 Claims, 3 Drawing Sheets

US 6,802,536 B2

ADAPTIVE ENERGY ABSORBING DEVICE FOR A STEERING COLUMN

TECHNICAL FIELD

This application relates generally to steering columns, and more particularly to adaptive energy absorbing devices for collapsible steering columns.

BACKGROUND OF THE INVENTION

Automotive steering column assemblies are often equipped with kinetic energy absorbing devices to reduce the likelihood of injury to an operator in the event of collision. One such device employs a plastically deformable metal strap which is drawn across an anvil in a crash event during the collapse of the steering column to absorb some of the energy of collapse.

Typically, the anvil is fixed and thus there is little control over the performance of the absorbing device.

SUMMARY OF THE INVENTION

An energy absorbing device for a collapsible steering column of a vehicle comprises a housing having at least one fixed abutment surface. At least one adjuster having an initial abutment surface is disposed in the housing for selective laterally slidable movement therein. At least one anvil is disposed in the housing between a surface of the housing and the initial abutment surface of the adjuster defining a first position of the anvil. A plastically deformable strap is supported at least in part between the anvil and the housing. The anvil has an arcuate mating surface engaging the strap restricting slidable movement therebetween. A base portion of the anvil engages the initial abutment surface of the adjuster maintaining the base portion in spaced relation from the fixed abutment surface of the housing. The adjuster is laterally slidable in response to a signal in a crash condition of the vehicle removing the adjuster from between the anvil and the housing. The base portion of the anvil can then move from the first position into mating contact with the fixed abutment surface of the housing in response to an applied force from the strap defining a second position of the anvil. The arcuate surface of the anvil has a first coefficient of friction against the strap while the anvil is in the first position and a second coefficient of friction against the strap while the anvil is in the second position. The second coefficient of friction is less than the first coefficient of friction, thereby allowing the steering column to collapse under a lighter axial load while the anvil is in the second position.

One object of the invention is to provide an energy absorbing device for a collapsible steering column that compensates for the severity of a vehicle crash and the size, weight and/or position of the driver.

The invention has the advantage of providing selectively slidable anvils which can move between different positions to vary the reaction path of the strap, and thereby control the energy absorption characteristics of the system.

One further advantage is that the system is of simple construction and is adaptable to many different crash conditions.

Other objects, features and advantages of the invention will become more apparent in view of the following description and drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
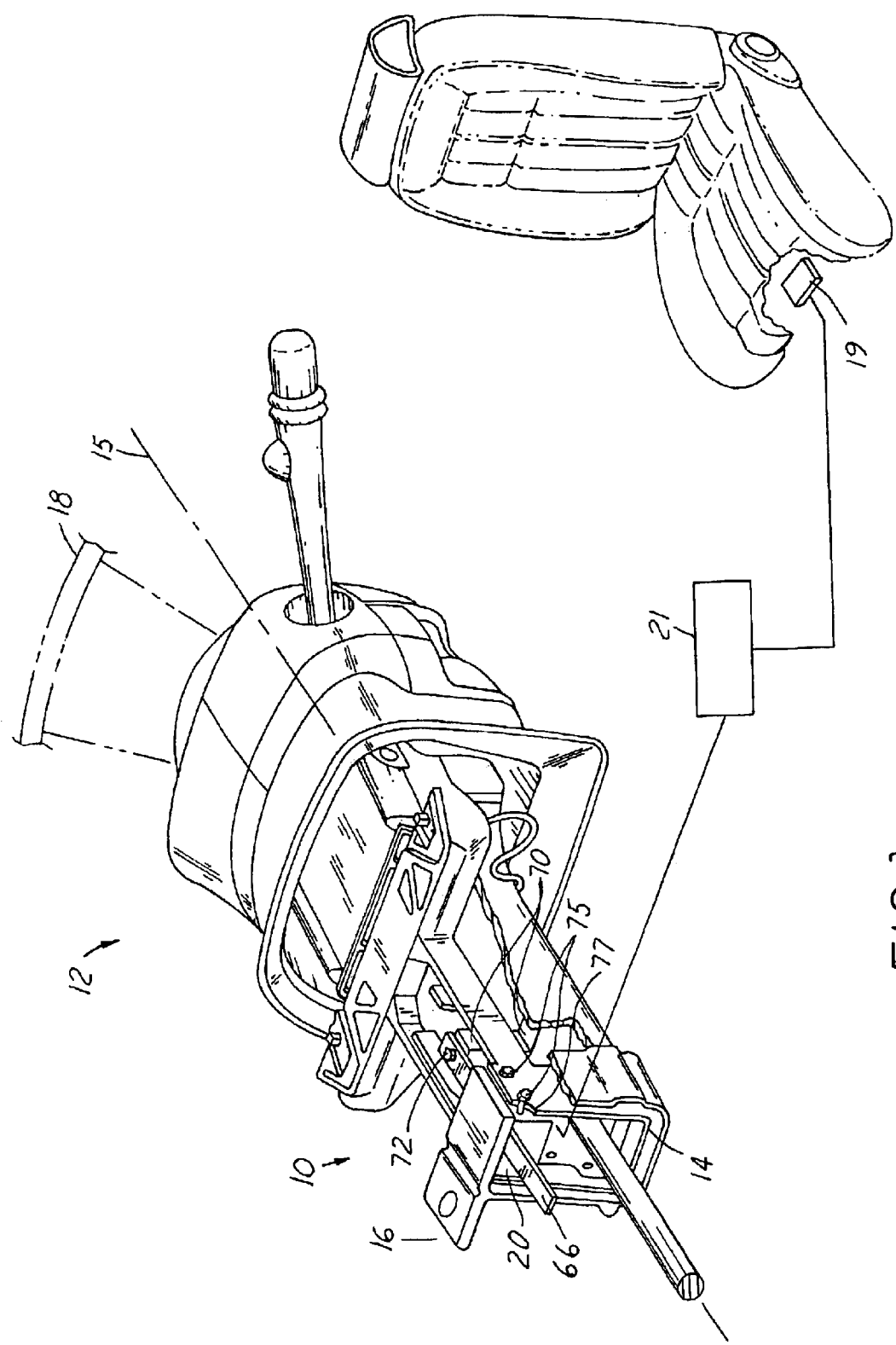
FIG. 1 is a perspective view of a motor vehicle steering column having an energy absorbing device constructed according to one embodiment of the invention.
Figure 2:
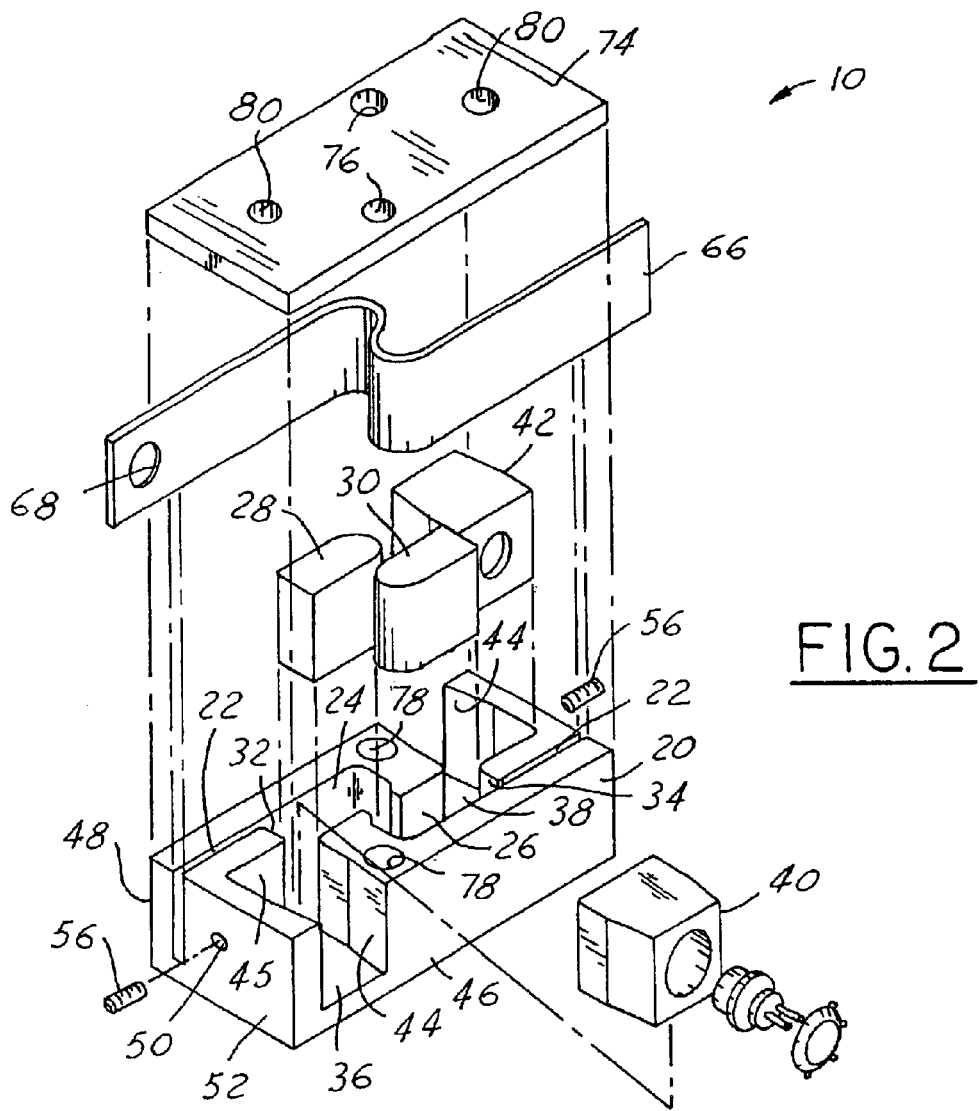
FIG. 2 is an exploded perspective view of the energy absorbing device of FIG. 1.
Figure 3:
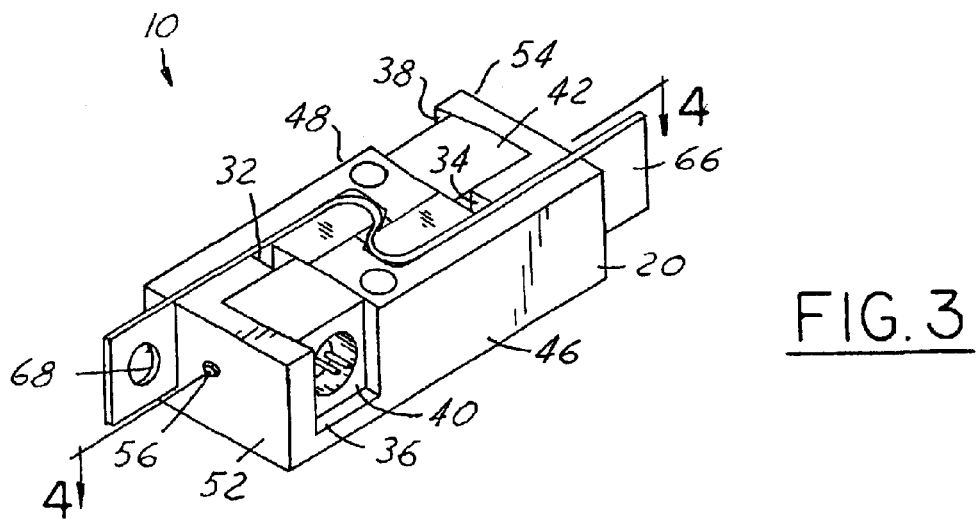
FIG. 3 is a partially assembled view of the energy absorbing device of FIG. 2, but with a cover omitted.
Figure 4:
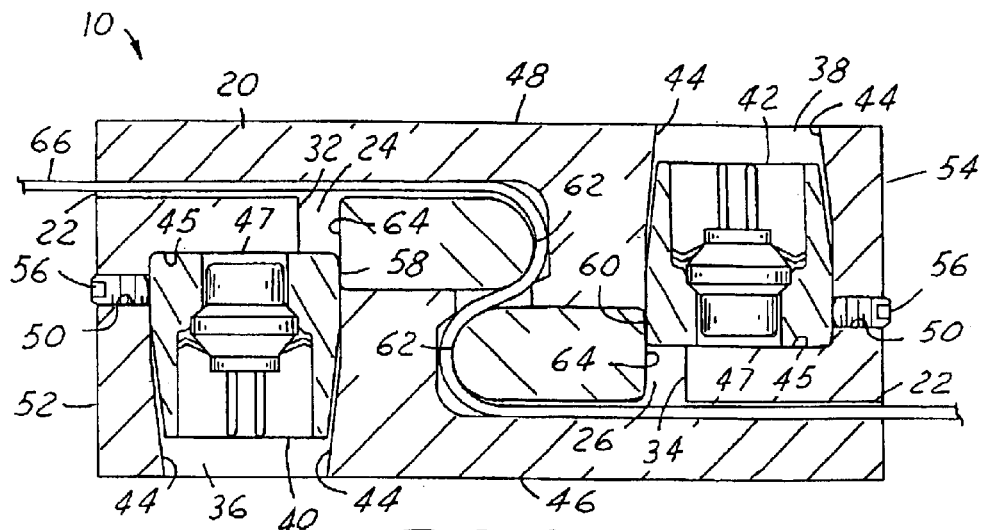
FIG. 4 is an enlarged cross-sectional plan view of the energy absorbing device of FIG. 3 showing a pair of anvils in a first position.

An energy absorbing device constructed according to a presently preferred embodiment of the invention is shown generally at 10 in FIGS. 1–6. The energy absorbing device 10 is shown for use in FIG. 1 with a steering column assembly 12 that includes a collapsible upper steering column jacket 14 relative to a lower bracket 16 generally along a longitudinal axis 15 of the assembly 12. In a crash condition of a motor vehicle (not shown) with another object, the vehicle body decelerates more rapidly than the operator (not shown) so that the operator is thrust against a hand wheel 18 of the motor vehicle. During impact, the energy absorbing device 10 receives a signal from a transducer or sensor 19 by way of an electrical connection to an electrical control module (ECM) or computer 21. The sensor 19 detects the operator's size or weight, position, etc. and relays the data to the onboard computer 21. The computer 21, in turn, generates a load curve using the data from the sensor for directing the energy absorbing device 10 to resist linear translation of the upper steering column jacket 14 to decelerate the operator, while at the same time converting into work a fraction of the operator's kinetic energy to reduce the potential harm to the operator.

The energy absorbing device 10 includes a housing 20 having a channel 22 with a serpentine path. Within the channel 22, at least one and preferably a pair of pockets 24, 26 are formed for receiving a pair of anvils 28, 30 respectively. Each pocket 24, 26 has a fixed abutment surface 32, 34 providing a final stop surface for the anvils, 28, 30 in a collapsing condition of the steering column assembly 12.

The housing 20 has an adjuster pocket for each anvil, shown here as a pair of adjustable pockets 36, 38 for receiving a pair of adjusters 40, 42, respectively. Each adjuster pocket 36, 38 extends generally laterally in relation to opposite sidewalls 46, 48 of the housing 20. The pockets 36, 38 preferably have a bottom or end surface 45 with tapered sidewalls 44 extending generally laterally therefrom and tapered toward one another so that they converge toward the side walls 46, 48. The tapered sidewalls 44 act to maintain the adjusters 40, 42 within the pockets 36, 38 upon lateral movement of the adjusters 40, 42 within the housing 20. Preferably, a threaded opening 50 is formed in each end 52, 54 of the housing 20 for receiving a pair of threaded fasteners 56 to maintain the adjusters 40, 42 in their initial position. When in their initial position, the adjusters 40, 42 present an initial abutment surface 58, 60 respectively, to maintain the anvils 28, 30 in a first position.

The adjusters 40, 42 are assembled within the adjuster pockets 36, 38 so that a bottom or end surface 47 of the adjusters 40, 42 preferably seat against the bottom or end surface 45 of the adjuster pockets 36, 38 to position the adjusters 40, 42 in their initial assembled position. When the adjusters 40, 42 are maintained in their initial position, the initial abutment surfaces 58, 60 extend into the pockets 24, 26 to maintain the anvils 28, 30 in a spaced relation from the fixed abutment surfaces 32, 34, respectively. The fasteners 56 are preferably threaded within the threaded openings 50 to engage the adjusters 40, 42 and to inhibit the adjusters from unintentional slidable movement within the adjuster pockets 36, 38. To facilitate laterally slidable movement of the adjusters 40, 42 within the adjuster pockets 36,. 38, preferably the adjusters 40, 42 have an explosive charge therein.

The anvils 28, 30 are inserted into the pockets 24, 26 with each anvil 28, 30 having an arcuate mating surface 62 with a base portion 64 generally opposite thereto. When inserted into the pockets 24, 26, and into their first position, the base portions 64 engage or abut the initial abutment surfaces 58, 60 of the adjusters, 40, 42 and are spaced from the fixed abutment surface 32, 34 of the housing 20. With the anvils 28, 30 in their first position, the channel 22 extends around the arcuate mating surfaces 62, thereby forming the serpentine path in which a plastically formable metal strap 66 is routed, such that the strap 66 takes on a generally S-shaped configuration as shown in the drawings.

The strap 66, with the anvils 28, 30 in their first position, wraps around the arcuate mating surfaces 62 of the anvils 28, 30 a predetermined number of degrees to restrict the slidable movement between the strap 66 and the anvils 28, 30. The strap 66 preferably has an opening 68 adjacent one of its ends for fastening the strap 66 to a fixed support 70 of the vehicle. A fastener 72 is shown fastening the strap 66 to the fixed support 70 to statically maintain the strap in its generally fixed position throughout a collapsing cycle of the steering column assembly 12.

To complete the assembly of the energy absorbing device 10, a cover 74 is fastened to the housing 20 preferably by way of a pair of fasteners 75 that pass through a pair of openings 77 in the upper steering column jacket 14, through a pair of fastener openings 76 in the cover 14 and into a pair of threaded openings 78 within the housing 20. As such, the fasteners 75 both attach the housing to the upper steering column jacket 14 and secure the cover 74 to the housing 20. The cover 74 preferably has a pair of openings 80 allowing the emission of gas from the pockets 36, 38 upon ignition or detonation of the explosive within of the adjusters 40, 42.

At the time of a crash or head-on collision in which the steering column assembly 12 collapses, conditions such as vehicle speed, driver seat position, driver weight or size, etc. are monitored by the sensor 19 and a signal is sent to the vehicle body computer 21 to generate an optimal load curve value to actuate or detonate the adjusters 40, 42. Depending on the results of the load curve value, either one or both of the adjusters 40, 42 detonate, thereby emitting a gas such that the respective adjusters 40, 42 travel laterally outwardly within the adjust pockets 36, 38. As such, the initial abutment surfaces 58, 60 are removed from between the anvils 28, 30 and the fixed abutment surfaces 32, 34. As a result, the anvils 28, 30 move from the first position into mating contact with the fixed abutment surfaces 32, 34 in response to an applied force from the metal strap 66 defining a second position of the anvils 28, 30.

Upon movement of the anvils 28, 30 from their first position to their second position, a first coefficient of friction between the arcuate mating surfaces 62 of the anvils 28, 30 and the strap 66 is reduced to a second coefficient of friction, thus allowing the steering column assembly 12 to collapse under a lighter axial load (i.e., with less resistance to deformation).

Figure 5:
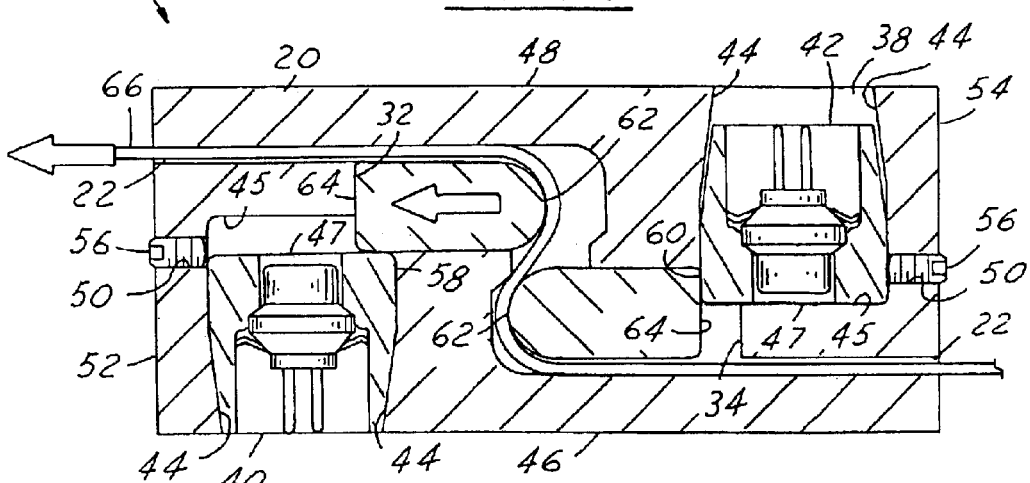
FIG. 5 is a view like FIG. 4, but showing one of the anvils moved to a second position.
Figure 6:
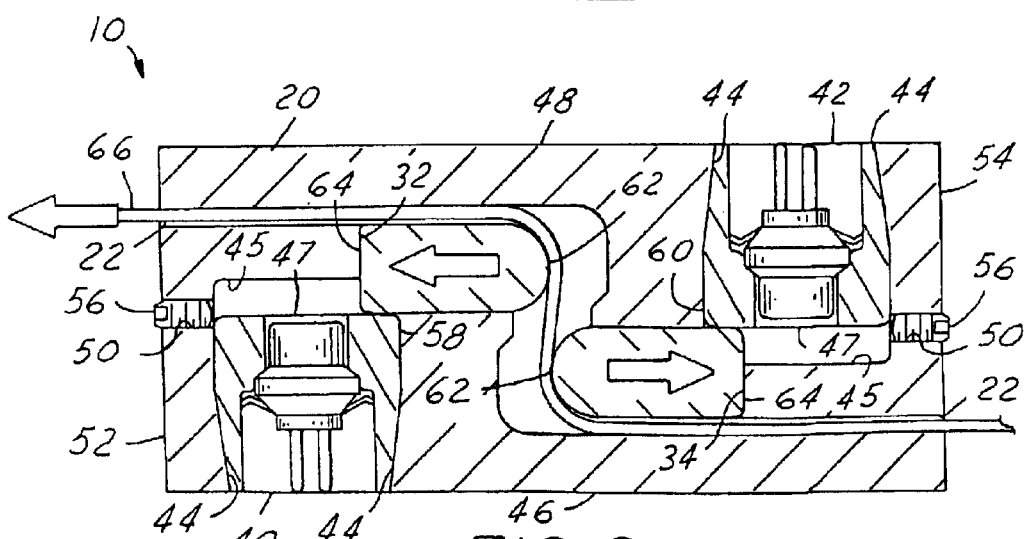
FIG. 6 is a view like FIG. 4, but showing both of the anvils moved to a second position.

As shown in FIG. 5, when one of the anvils 28 moves from its first position to its second position, the strap 66 moves from a more severe S-shaped configuration to a less severe S-shaped configuration. As a result, the predetermined number of degrees of wrap of the strap 66 about the arcuate mating surfaces 62 is altered to a lesser predetermined number of degrees of wrap when the anvil 28 is seated against the fixed abutment surface 32 and in its second position. Further yet, as seen in FIG. 6, when both anvils 28, 30 move from their first positions to their second positions, the strap 66 takes on an even less severe S-shaped configuration, and thus the number of degrees of wrap of the strap 66 about the arcuate mating surfaces 62 is further reduced. As a result, the predetermined number of degrees of wrap of the strap 66 about the arcuate mating surfaces 62 while the anvils 28, 30 are in their first position is greater than the predetermined degrees of wrap of the strap 66 about the arcuate mating surfaces 62 while the anvils 28, 30 are in their second position. With fewer degrees of wrap of the strap 66 about the arcuate mating surfaces 62, the coefficient of friction between the strap 66 and the arcuate mating surfaces 62 is reduced. This allows the housing 20 of the energy absorbing device 10 to slide relative to the plastically deformable strap 66 under a lighter applied axial load along the longitudinal axis 15 of the steering column assembly 12.

It should be recognized, that the movement of one or both of the anvils 28, 30 from their first position to their second position is dependent upon the signal received from the ECM to the adjusters 40, 42. If conditions warrant a more resistant system to collapsing of the steering column assembly 12, then only one of the adjusters 40, 42 will ignite and move laterally within the respective adjuster pocket 36, 38. However, if conditions warrant a more compliant system, then both adjusters 40, 42 will ignite to move laterally within the adjuster pockets 36, 38. Either way, upon removal of one or more of the adjusters 40, 42 from between the anvils 28, 30 and the fixed abutment surfaces 32, 34, the anvils 28, 30, upon being forced by the strap 66 to move to their second position, move generally away from one another toward their respective fixed abutment surfaces 32, 34.

It should be recognized that although the adjusters 40, 42 are represented here as having an explosive charge, the adjusters 40, 42 could comprise other mechanisms to facilitate lateral movement of the adjusters within the pockets 36, 38, such as solenoids or the like.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. An energy absorbing device for a collapsible steering column of a vehicle, comprising:

a housing having at least one fixed abutment surface;

at least one adjuster disposed in said housing for selective lateral slidable movement therein and having an initial abutment surface;

at least one anvil disposed in said housing abutting said initial abutment surface of said adjuster and spaced longitudinally from said fixed abutment surface in a first position of said anvil;

a plastically deformable strap supported at least in part for engagement between said anvil and said housing; and said anvil having an arcuate mating surface engaging said strap restricting slidable movement therebetween and having a base portion for engaging said initial abutment surface of said adjuster maintaining said base portion in spaced relation from said fixed abutment surface of said housing and said adjuster being laterally slidable in response to a signal in a crash condition of the vehicle removing said adjuster from between said anvil and said housing allowing said base portion of said anvil to move from said first position into mating contact with said fixed abutment surface of said housing in response to an applied force from said strap defining a second position of said anvil, said arcuate surface of said anvil having a first coefficient of friction with said strap while said anvil is in said first position and said arcuate surface having a second coefficient of friction with said strap while said anvil is in said second position, said second coefficient of friction being less than said first coefficient of friction allowing the steering column to collapse under a lighter axial load while said anvil is in said second position.

2. The energy absorbing device of claim 1 wherein said housing has a pair of fixed abutment surfaces and a pair of adjusters disposed in said housing with a pair of anvils disposed in said housing between said pair of fixed abutment surfaces and said pair of adjusters defining said first position of each of said pair of anvils and said pair of adjusters being individually slidable in response to the signal in a crash condition of the vehicle removing at least one of said pair of adjusters from between the respective one of said pair of anvils and the respective one of said pair of fixed abutment surfaces causing the respective one of said pair of anvils to move to said second position under the force of said strap.

3. The energy absorbing device of claim 2 wherein said pair of fixed abutment surfaces in said housing are generally opposite one another.

4. The energy absorbing device of claim 3 wherein said pair of anvils move generally away from one another when moving from said first position to said second position.

5. The energy absorbing device of claim 2 wherein said strap wraps around arcuate mating surfaces of said pair of anvils a predetermined number of degrees while said pair of anvils are in said first position and said strap wraps around said arcuate mating surfaces of said pair of anvils a predetermined number of degrees while said pair of anvils are in said second position, said predetermined number of degrees while in said first position being greater than said predetermined number of degrees while in said second position.

6. The energy absorbing device of claim 5 wherein said strap is configured in a generally S-shaped pattern between said arcuate mating surfaces of said anvils and said housing.

7. The energy absorbing device of claim 6 wherein said generally S-shaped pattern is more defined while at least one of said anvils is in said first position.

8. The energy absorbing device of claim 1 wherein said strap is configured in a generally S-shaped pattern between said arcuate mating surface of said anvil and said housing.

9. The energy absorbing device of claim 1 wherein said adjuster comprises an explosive device emitting a gas to undertake laterally slidable movement.

10. The energy absorbing device of claim 9 wherein said housing has an opening providing for emission of said gas.

* * * * *

UNITED STATES PATENT AND TRADEMARK OFFICE
CERTIFICATE OF CORRECTION

PATENT NO. : 6,802,536 B2 Page 1 of 1
APPLICATION NO. : 10/373402
DATED : October 12, 2004
INVENTOR(S) : Marvin V. Manwaring et al.

It is certified that error appears in the above-identified patent and that said Letters Patent is hereby corrected as shown below:

Title Page item 75 should read

Marvin V. Manwaring; Melvin Lee Tinnin; Ravindra Jwalapathy; Ray G. Armstrong.

Signed and Sealed this

Fifth Day of February, 2008

JON W. DUDAS
*Director of the United States Patent and Trademark Office*

UNITED STATES PATENT AND TRADEMARK OFFICE
Certificate

Patent No. 6,802,536 B2                                                                   Patented: October 12, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Marvin V. Manwaring, Clio, MI (US); Melvin Lee Tinnin, Clio, MI (US); Ravindra Jwalapathy, Saginaw, MI (US); and Ray G. Armstrong, Bay City, MI (US).

Signed and Sealed this Twenty-sixth Day of February 2008.

*PAUL N. DICKSON*
*Supervisory Patent Examiner*
*Art Unit 3616*